… [54] O-ALKYL-(THIONO) THIOL-S-(S-ALKYLMERCAPTO-S-BENZYLMERCAPTO-METHYL)-PHOSPHORIC (PHOSPHONIC) ACID ESTERS

[75] Inventors: Gerhard Schrader, Wuppertal; Ingeborg Hammann, Cologne, both of Germany

[73] Assignee: Bayer Aktiengesellschaft, Leverkusen, Germany

[22] Filed: Feb. 27, 1973

[21] Appl. No.: 336,316

[30] Foreign Application Priority Data
    Mar. 7, 1972  Germany............................ 2210836

[52] U.S. Cl.................................. 260/948, 424/216
[51] Int. Cl.......... A01n 9/36, C07f 9/16, C07f 9/40
[58] Field of Search..................................... 260/948

[56]         References Cited
         UNITED STATES PATENTS
2,959,516  11/1960  Sallmann ........................ 260/948 X
3,105,003  9/1963   Walsh et al..................... 260/948 X FOREIGN PATENTS OR APPLICATIONS
  244,258  4/1963   Australia............................ 260/948

Primary Examiner—Lorraine A. Weinberger
Assistant Examiner—Richard L. Raymond
Attorney, Agent, or Firm—Burgess, Dinklage & Sprung

[57]            ABSTRACT

O-alkyl-(thiono)thiol-S-[S'-alkylmercapto-S''-benzylmercapto-methyl]-phosphoric (phosphonic) acid esters of the formula

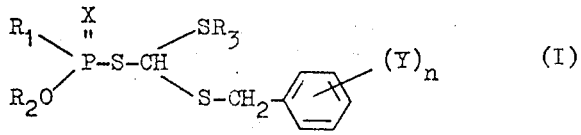

in which
  $R_1$ is alkyl or alkoxy of 1 to 6 carbon atoms,
  $R_2$ is alkyl of 1 to 6 carbon atoms,
  $R_3$ is alkyl of 1 to 6 carbon atoms,
  X is oxygen or sulfur,
  Y is chlorine, and
  n is 0, 1 or 2, which possess insecticidal and acaricidal properties.

7 Claims, No Drawings

O-ALKYL-(THIONO) THIOL-S-(S-ALKYLMERCAPTO-S-BENZYLMERCAPTO-METHYL)-PHOSPHORIC (PHOSPHONIC) ACID ESTERS

The present invention relates to and has for its objects the provision of particular new O-alkyl-(thiono) thiol-S-[S'-alkylmercapto-S''-benzylmercapto-methyl]-phosphoric (phosphonic) acid esters optionally chlorine substituted on the benzene ring, which possess insecticidal and acaricidal properties, active compositions in the form of mixtures of such compounds with solid and liquid dispersible carrier vehicles, and methods for producing such compounds and for using such compounds in a new way especially for combating pests, e.g., insects and acarids, with other and further objects becoming apparent from a study of the within specification and accompanying examples.

In German Patent Specifications Nos. 830,509 and 947,369 there are described 0,0-diethyl-S-[arylmercaptomethyl]-thiol- or -thionothiol-phosphoric acid esters, for example 0,0-diethyl-S-[(4-methylphenylmercapto)-methyl]-thiol-(Compound A) and 0,0-diethyl-S-[phenylmercaptomethyl]-thionothiol-phosphoric acid ester (Compound B). The information given in these specifications indicates that these products are distinguished by an outstanding insecticidal effectiveness.

Furthermore, from German Published Specification DAS No. 1,148,549 the analogous thionothiolphosphonic acid esters, for example ethyl-0-ethyl-S-[phenylmercaptomethyl]-thionothiolphosphonic acid ester (Compound C) and the corresponding 2-, 3- and 4-chlorophenylmercapto derivatives, are also known. These compounds likewise possess insecticidal properties.

The present invention provides thiol- or thionothiol-S-[S'-alkylmercapto-S''-benzylmercapto-methyl]-phosphoric or -phosphonic acid esters of the general formula

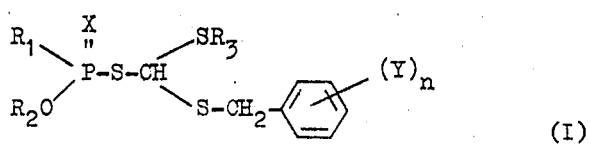

(I)

in which
$R_1$ is alkyl or alkoxy of 1 to 6 carbon atoms,
$R_2$ is alkyl of 1 to 6 carbon atoms,
$R_3$ is alkyl of 1 to 6 carbon atoms,
X is oxygen or sulfur,
Y is chlorine, and
n is 0, 1 or 2.

Preferably, $R_1$ is optionally halogen-substituted lower alkyl or alkoxy with 1 to 4 carbon atoms such as methyl, methoxy, ethyl, ethoxy, $\beta$-chloroethoxy, $\beta$-chloroethyl, $\beta,\beta,\beta$-trichloroethoxy, n- or iso-propyl, n- or iso-propoxy, n-, iso- or sec.-butyl or n-, iso- or sec.-butoxy, $R_2$ is optionally halogen-substituted lower alkyl with 1 – 4 carbon atoms such as methyl, ethyl, $\beta$-chloroethyl, $\beta,\beta,\beta$-trichloroethyl, n- or isopropyl, n-, iso- or sec.-butyl, $R_1$ and $R_2$ possibly being the same or different from each other, $R_3$ is methyl or ethyl, and n is 0.

The invention also provides a process for the production of such a compound in which a thiol- or thionothiol-phosphoric (-phosphonic) acid salt of the general formula

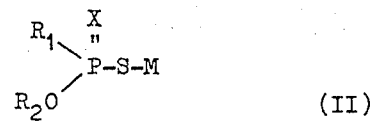

(II)

is reacted with a benzylmercapto-monohalomethyl alkyl thioether of the general formula

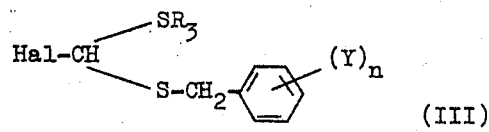

(III)

in which
$R_1$, $R_2$, $R_3$, X, Y and n have the same meanings as above, M is a univalent metal equivalent or ammonium, and Hal is chlorine or bromine.

The course of the process can be represented by the following reaction scheme (IV)

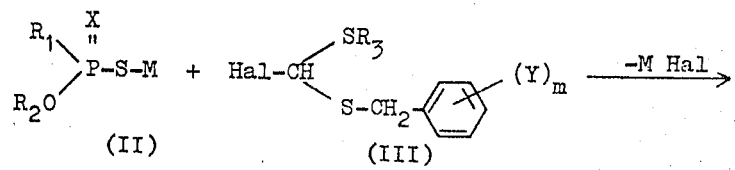

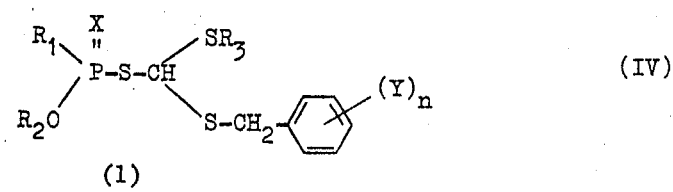

(IV)

M stands preferably for an alkali metal ion, particularly potassium or sodium, or ammonium.

The benzylmercapto-monohalomethyl alkyl thioethers of the general formula (III) required as starting materials are readily available even on an industrial scale, for example by the following route:

Benzylmercaptan is reacted with monochloromethyl ethyl thioether according to the following equation (a) to give benzylmercaptomethyl ethyl thioether and the latter is chlorinated according to (b):

(a) 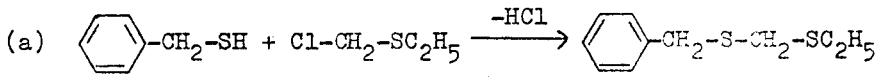

(b) 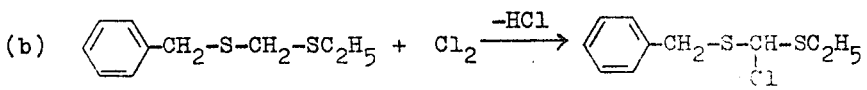

The process according to the invention for the preparation of the compounds of formula (I) is preferably carried out in the presence of a solvent or diluent. As such, practically all organic solvents inert to the reactants are suitable. These include hydrocarbons which may be chlorinated, such as benzene, toluene, xylene and chlorobenzene; and ethers, for example diethyl and dibutyl ether and dioxane. For this purpose, however, low-boiling aliphatic ketones or nitriles such as acetone, methyl ethyl, methyl isobutyl and methyl isopropyl ketone, acetonitrile and propionitrile, have proved particularly satisfactory.

The reaction may be carried out within a fairly wide temperature range. In general, the reaction is carried out at about 0° to 80°C or the boiling point of the reaction mixture if lower than 80°C, preferably at 20° to 70°C.

According to the equation (IV) recited above, in the reaction equimolar amounts of benzylmercapto-monohalomethyl alkyl thioether and of thiol- or thionothiol-phosphoric(-phosphonic) acid salt are theoretically necessary.

Expediently, a mixture of (thiono)thiol-phosphoric(-onic) acid salt and one of the above-mentioned solvents, preferably acetonitrile, is provided, and the benzylmercapto-halomethyl ethyl thioether is added dropwise to this mixture. After completion of the addition, the reaction mixture is, in order to complete the reaction, stirred for a further 1 to 3 hours, possibly with slight heating, and it is then cooled to room temperature. The working up of the mixture may take place in customary manner by taking up the separated reaction product in most cases as an oil, in one of the hydrocarbons mentioned above, preferably benzene, washing and drying the organic phase and evaporating the solvent.

The new compounds are obtained in most cases in the form of colorless to slightly yellow-colored, water-insoluble oils which cannot, even under greatly reduced pressure, be distilled without decomposition. They can be characterized by their refractive indices.

The thiol- or thionothiol-phosphoric or -phosphonic acid esters according to the invention are distinguished by outstanding insecticidal, acaricidal and, in many cases, fungitoxic and rodenticidal properties, with, in some cases, extremely low phytotoxicity. The products may therefore be used in crop protection and the protection of stored products, as well as in the hygiene field, for the control of noxious sucking and biting insects, Diptera and mites (Acari).

To the sucking insects there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the current gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*.

In the case of the biting insects, above all there should be mentioned butterfly caterpillars (Lepidoptera) such as the diamond-back moth (*Plutella maculipennis*), the gypsy moth (*Lymantria dispar*), the browntail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cottom worm (*Prodenia litura*), the ermine moth (*Hyponomeuta padella*), the Mediterranean flour moth (*Ephestia kuhniella*) and greater wax moth (*Galleria mellonella*).

Also to be classed with the biting insects are beetles (Coleoptera), for example the granary weevil (*Sitophilus granarius = Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius = Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Gryllus domesticus*); termites such as the eastern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicylaris*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (Acari) there are classed, in particular, the spider mites (Tetranychidae) such as the two-spotted spider mite (*Tetranychus urticae*) and the European red mite (*Paratetranychus pilosus* = *Panonychus ulmi*), gall mites, for example the black current gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*).

When applied against hygiene pests and pests of stored products, particularly flies and mosquitoes, the novel products are also distinguished by an outstanding residual activity on wood and clay, as well as a good stability to alkali on limed substrates.

The active compounds according to the instant invention can be utilized, if desired, in the form of the usual formulations or compositions with conventional inert (i.e., plant compatible or herbicidally inert) pesticide diluents or extenders, i.e., diluents, carriers or extenders of the type usable in conventional pesticide formulations or compositions, e.g., conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon, inert dispersible liquid diluent carriers, including inert organic solvents, such as aromatic hydrocarbons (e.g., benzene, toluene, xylene, alkyl naphthalenes, etc.), halogenated, especially chlorinated, aromatic hydrocarbons (e.g., chlorobenzenes, etc.), cycloalkanes (e.g., cyclohexane, etc.), paraffins (e.g., petroleum or mineral oil fractions), chlorinated aliphatic hydrocarbons (e.g., methylene chloride, chloroethylenes, etc.), alcohols (e.g., methanol, ethanol, propanol, butanol, glycol, etc.) as well as ethers and esters thereof (e.g., glycol monomethyl ether, etc.), amines (e.g., ethanolamine, etc.), amides (e.g., dimethyl formamide, etc.), sulfoxides (e.g., dimethyl sulfoxide etc.), acetonitrile, ketones (e.g., acetone, methyl ethyl ketone, methyl isobutyl ketone, cyclohexanone, etc.), and/or water; as well as inert dispersible finely divided solid carriers, such as ground natural minerals (e.g., kaolins, clays, alumina, silica, chalk, i.e., calcium carbonate, talc, attapulgite, montmorillonite, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides and acaricides or rodenticides, fungicides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0001–10 percent, preferably 0.01–1 percent, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.0001–95 percent, and preferably 0.01–95 percent, by weight of the mixture.

The active compounds can also be used in accordance with the well known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 15 to 1,000 g/hectare, preferably 40 to 600 g/hectare, are sufficient. In this process it is possible to use highly concentrated liquid compositions with said liquid carrier vehicles containing from about 20 to about 95 percent by weight of the active compound or even the 100 percent active substance alone, e.g., about 20–100 percent by weight of the active compound.

Furthermore, the present invention contemplates methods of selectively killing, combating or controlling pests, e.g., insects and acarids, which comprises applying to at least one of correspondingly (a) such insects, (b) such acarids, and (f) the corresponding habitat thereof, i.e., the locus to be protected, a correspondingly combative or toxic amount, i.e., an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, encrustation, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Phaedon larvae test
Solvent: 3 parts by weight acetone
Emulsifier: 1 part by weight alkylarylpolyglycol ether To produce a suitable preparation of active compound, 1 part by weight of the active compound was mixed with the stated amount of solvent containing the stated amount of emulsifier, and the concentrate was diluted with water to the desired concentration.

Cabbage leaves (*Brassica oleracea*) were sprayed with the preparation of the active compound until dripping wet and then infested with mustard beetle larvae (*Phaedon cochleariae*).

After the specified periods of time, the degree of destruction was determined as a percentage: 100 percent means that all the beetle larvae were killed. 0 percent means that none of the beetle larvae were killed.

The active compounds, the concentration of the active compounds, the times of evaluation and the results can be seen from the following Table 1.

Table 1

(Phaedon larvae test)

| Active compound | | Concentration of active compound in % by weight | Degree of destruction in % after 3 days |
|---|---|---|---|
| $(C_2H_5O)_2P(S)-S-CH_2-S-C_6H_5$ (known) | (B) | 0.1<br>0.01 | 100<br>0 |
| $(C_2H_5O)_2P(O)-S-CH_2-S-C_6H_4-CH_3$ (known) | (A) | 0.1<br>0.01 | 100<br>0 |
| $(C_2H_5O)(C_2H_5)P(S)-S-CH(SC_2H_5)(S-CH_2-C_6H_5)$ | (2) | 0.1<br>0.01 | 100<br>100 |
| $(C_2H_5O)(C_2H_5)P(O)-S-CH(SC_2H_5)(S-CH_2-C_6H_5)$ | (4) | 0.1<br>0.01 | 100<br>100 |
| $(C_2H_5O)_2P(S)-S-CH(SC_2H_5)(S-CH_2-C_6H_5)$ | (1) | 0.1<br>0.01 | 100<br>100 |
| $(C_2H_5O)_2P(O)-S-CH(SC_2H_5)(S-CH_2-C_6H_5)$ | (3) | 0.1<br>0.01<br>0.001 | 100<br>100<br>90 |

EXAMPLE 2

Plutella test
Solvent: 3 parts by weight acetone
Emulsifier: 1 part by weight alkylarylpolyglycol ether To produce a suitable preparation of active compound, 1 part by weight of the active compound was mixed with the stated amount of solvent containing the stated amount of emulsifier and the concentrate was diluted with water to the desired concentration.

Cabbage leaves (*Brassica oleracea*) were sprayed with the preparation of the active compound until dew moist and were then infested with caterpillars of the diamond-back moth (*Plutella maculipennis*).

After the specified periods of time, the degree of destruction was determined as a percentage: 100 percent means that all the caterpillars were killed whereas 0 percent means that none of the caterpillars were killed.

The active compounds, the concentrations of the active compounds, the evaluation times and the results can be seen from the following Table 2.

EXAMPLE 3

Doralis test (systemic action)
Solvent: 3 parts by weight acetone
Emulsifier: 1 part by weight alkylarylpolyglycol ether To produce a suitable preparation of active compound, 1 part by weight of the active compound was mixed with the stated amount of solvent containing the stated amount of emulsifier, and the concentrate was diluted with water to the desired concentration.

Bean plants (*Vicia faba*) which had been heavily infested with the bean aphid (*Doralis fabae*) were watered with the preparation of the active compound so that the preparation of the active compound penetrated into the soil without wetting the leaves of the bean plants. The active compound was taken up by the bean plants from the soil and so reached the infested leaves.

After the specified periods of time, the degree of destruction was determined as a percentage. 100 percent means that all the aphids were killed; 0 percent means that none of the aphids were killed.

Table 2

(Plutella test)

| Active compound | | Concentration of active compound in % by weight | Degree of destruction in % after 3 days |
|---|---|---|---|
| 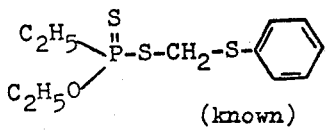 (known) | (C) | 0.1<br>0.01 | 100<br>0 |
| 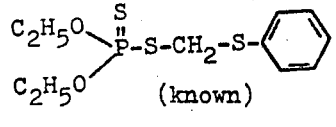 (known) | (B) | 0.1<br>0.01 | 60<br>0 |
| 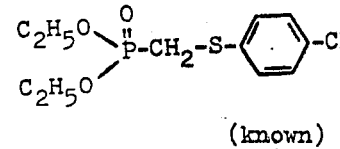 (known) | (A) | 0.1<br>0.01 | 90<br>0 |
| 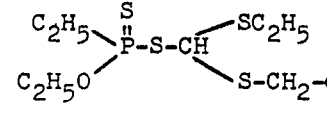 | (2) | 0.1<br>0.01 | 100<br>100 |
| 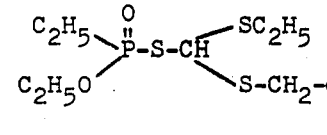 | (4) | 0.1<br>0.01<br>0.001 | 100<br>100<br>50 |
| 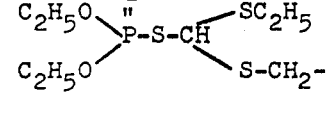 | (1) | 0.1<br>0.01 | 100<br>90 |

The active compounds, the concentrations of the active compounds, the evaluation times and the results can be seen from the following Table 3.

of approximately 10 – 30 cm., were sprayed with the preparation of the active compound until dripping wet. These bean plants were heavily infested with the two- Table 3

(Doralis test / systemic action)

| Active compound | | Concentration of active compound in % by weight | Degree of destruction in % after 4 days |
|---|---|---|---|
| $\underset{C_2H_5O}{\overset{C_2H_5}{>}}\overset{S}{\underset{\|}{P}}-S-CH_2-S-\text{Ph}$ (known) | (C) | 0.1 | 0 |
| $\underset{C_2H_5O}{\overset{C_2H_5O}{>}}\overset{S}{\underset{\|}{P}}-S-CH_2-S-\text{Ph}$ (known) | (B) | 0.1 | 0 |
| $\underset{C_2H_5O}{\overset{C_2H_5O}{>}}\overset{O}{\underset{\|}{P}}-S-CH_2-S-\text{Ph}-CH_3$ (known) | (A) | 0.1 | 0 |
| $\underset{C_2H_5O}{\overset{C_2H_5}{>}}\overset{O}{\underset{\|}{P}}-S-CH\underset{S-CH_2-\text{Ph}}{\overset{SC_2H_5}{<}}$ | (4) | 0.1<br>0.01<br>0.001 | 100<br>100<br>90 |
| $\underset{C_2H_5O}{\overset{C_2H_5O}{>}}\overset{S}{\underset{\|}{P}}-S-CH\underset{S-CH_2-\text{Ph}}{\overset{SC_2H_5}{<}}$ | (1) | 0.1<br>0.01 | 100<br>100 |
| $\underset{C_2H_5O}{\overset{C_2H_5O}{>}}\overset{O}{\underset{\|}{P}}-S-CH\underset{S-CH_2-\text{Ph}}{\overset{SC_2H_5}{<}}$ | (3) | 0.1<br>0.01 | 100<br>100 |

EXAMPLE 4

Tetranychus test (resistant)
Solvent: 3 parts by weight acetone
Emulsifier: 1 part by weight alkylarylpolyglycol ether To produce a suitable preparation of active compound, 1 part by weight of the active compound was mixed with the stated amount of solvent containing the stated amount of emulsifier and the concentrate so obtained was diluted with water to the desired concentration.

Bean plants (*Phaseolus vulgaris*), which has a height of approximately 10 – 30 cm., were sprayed with the preparation of active compound until dripping wet. These bean plants were heavily infested with the two-spotted spider mite (*Tetranychus urticae*) in all stages of development.

After the specified periods of time, the effectiveness of the preparation of active compound was determined by counting the dead mites. The degree of destruction thus obtained is expressed as a percentage: 100 percent means that all the spider mites were killed whereas 0 percent means that none of the spider mites were killed.

The active compounds, the concentrations of the active compounds, the evaluation times and the results can be seen from the following Table 4.

Table 4

(Tetranychus test / resistant)

| Active compound | | Concentration of active compound in % by weight | Degree of destruction in % after 2 days |
|---|---|---|---|
| $\begin{array}{c}C_2H_5\\C_2H_5O\end{array}\!\!>\!\!\overset{S}{\underset{\|}{P}}\!-\!S\!-\!CH_2\!-\!S\!-\!\text{C}_6H_5$ (known) | (C) | 0.1 | 0 |
| $\begin{array}{c}C_2H_5O\\C_2H_5O\end{array}\!\!>\!\!\overset{S}{\underset{\|}{P}}\!-\!S\!-\!CH_2\!-\!S\!-\!\text{C}_6H_5$ (known) | (B) | 0.1 | 0 |
| $\begin{array}{c}C_2H_5O\\C_2H_5O\end{array}\!\!>\!\!\overset{O}{\underset{\|}{P}}\!-\!S\!-\!CH_2\!-\!S\!-\!\text{C}_6H_4\!-\!CH_3$ (known) | (A) | 0.1 | 0 |
| $\begin{array}{c}C_2H_5\\C_2H_5O\end{array}\!\!>\!\!\overset{S}{\underset{\|}{P}}\!-\!S\!-\!CH\!\!<\!\!\begin{array}{c}SC_2H_5\\S\!-\!CH_2\!-\!C_6H_5\end{array}$ | (2) | 0.1 | 98 |
| $\begin{array}{c}C_2H_5\\C_2H_5O\end{array}\!\!>\!\!\overset{O}{\underset{\|}{P}}\!-\!S\!-\!CH\!\!<\!\!\begin{array}{c}SC_2H_5\\S\!-\!CH_2\!-\!C_6H_5\end{array}$ | (4) | 0.1 | 100 |
| $\begin{array}{c}C_2H_5O\\C_2H_5O\end{array}\!\!>\!\!\overset{S}{\underset{\|}{P}}\!-\!S\!-\!CH\!\!<\!\!\begin{array}{c}SC_2H_5\\S\!-\!CH_2\!-\!C_6H_5\end{array}$ | (1) | 0.1 | 90 |
| $\begin{array}{c}C_2H_5O\\C_2H_5O\end{array}\!\!>\!\!\overset{O}{\underset{\|}{P}}\!-\!S\!-\!CH\!\!<\!\!\begin{array}{c}SC_2H_5\\S\!-\!CH_2\!-\!C_6H_5\end{array}$ | (3) | 0.1 | 95 |

The process of this invention is illustrated by the following preparative examples.

EXAMPLE 5

Preparation of the benzylmercapto-monohalomethyl alkyl thioethers required as starting products were carried out for example in the following way:

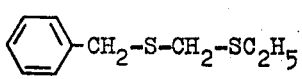

1-molar mixture:

124 g benzylmercaptan were dissolved in 400 ml acetonitrile. To this solution were added 112 g monochloromethyl ethyl thioether; 1 mole of sodium methylate solution was then added to it dropwise at 20° to 40°C, with stirring; the reaction mixture was stirred for a further 1 hour and it was poured into 400 ml benzene. The benzene solution was subsequently washed with ice water, separated and dried over sodium sulfate. In the ensuing fractional distillation there was obtained 186 g (94 percent of theory) of benzylmercaptomethyl ethyl thioether of the b.p. 108°C/2 mm Hg and the refractive index $n_D^{24} = 1.5781$ (b)

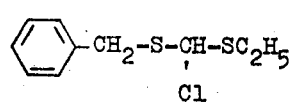

0.5-molar mixture:

99 g benzylmercaptomethyl ethyl thioether were dissolved in 350 ml methylene chloride. To this solution were added at 20° to 35°C, with stirring, 70 g sulfuryl chloride; the mixture was heated to 40°C for a further 30 minutes and the solvent was then removed under reduced pressure. There were obtained in this way 95 g (82 percent of theory) of benzylmercapto-monochloromethyl ethyl thioether with the refractive index $n_D^{23} = 1.5752$.

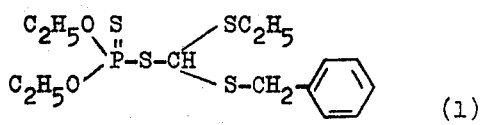

(1)

0.3-molar mixture:

63 g sodium 0,0-diethylthionothiolphosphate were dissolved in 300 ml acetonitrile. To this solution there were added at room temperature, with stirring, 70 g benzylmercapto-monochloromethyl ethyl thioether; the mixture was heated to 60° to 70°C for a further hour and the reaction mixture was then taken up in 300 ml benzene. The benzene solution was washed twice with, in each case, 70 ml of water and subsequently dried over sodium sulfate. After evaporation of the solvent 100 g (87 percent of theory) of 0,0-diethyl-S-[S'-ethylmercapto-S''-benzylmercaptomethyl]-thionothiolphosphoric acid ester were obtained in the form of a colorless, water-insoluble oil with the refractive index $n_D^{22.5} = 1.5810$.

Calculated for a molecular weight of 382:

| P | 8.1 %; | found: | 7.9 %; |
| S | 33.5 %; | | 32.9 %. |

EXAMPLE 6

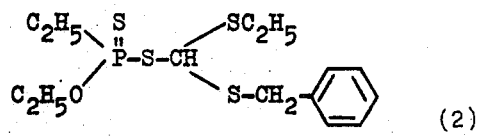

(2)

0.3-molar mixture:

63 g potassium ethyl-0-ethylthionothiolphosphonate were dissolved in 300 ml acetonitrile. To the solution obtained there were added, with stirring, 70 g benzylmercapto-monochloromethyl ethyl thioether; the mixture was subsequently stirred for a further hour at 60° to 65°C and it was then worked up as in Example 5. 96 g (87 percent of theory) of ethyl-0-ethyl-S-[S'-ethylmercapto-S''-benzylmercapto-methyl]-thionothiolphosphonic acid ester were obtained in the form of a slightly yellow, water-insoluble oil with the refractive index $n_D^{22} = 1.5882$.

Calculated for a molecular weight of 366:

| P | 8.5 %; | found: | 8.7 %; |
| S | 35.0 %; | | 34.9 %. |

EXAMPLE 7

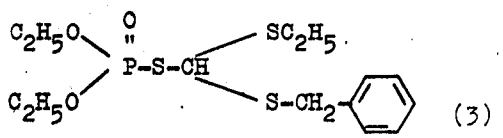

(3)

0.18-molar mixture:

36 g ammonium 0,0-diethylthiolphosphate were dissolved in 200 ml acetonitrile. To this solution there were added, with stirring, 42 g benzylmercapto-monochloromethyl ethyl thioether; the reaction mixture was heated to 70°C for a further hour and it was then worked up as in Example 1. 46 g (70 percent of theory) of 0,0-diethyl-S-[S'-ethylmercapto-S''-benzylmercaptomethyl]-thiolphosphoric acid ester were obtained in the form of a colorless, water-insoluble oil with the refractive index $n_D^{21} = 1.5645$.

Calculated for a molecular weight of 366:

| P | 8.5 %; | found | 8.4 %; |
| S | 26.2 %; | | 26.0 %. |

EXAMPLE 8

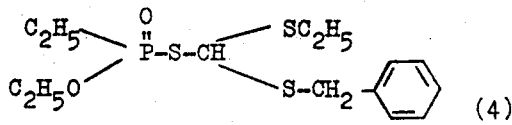

(4)

0.18-molar mixture:

35 g potassium ethyl-0-ethylthiolphosphonate were dissolved in 200 ml acetonitrile. To the solution obtained were added 42 g benzylmercapto-monochloromethyl ethyl thioether; the mixture was heated to 65°C for 1 hour and it was worked up as in Example 5. 54 g (86 percent of theory) of ethyl-0-ethyl-S-[S'-ethylmercapto-S''-benzylmercapto-methyl]-thiolphosphonic acid ester were obtained in the form of a water-insoluble, pale-yellow oil with the refractive index $n_D^{21} = 1.5595$.

Calculated for a molecular weight of 350:

| P | 9.8 %; | found | 8.1 %; |
| S | 27.4 %; | | 27.2 %. |

EXAMPLE 9

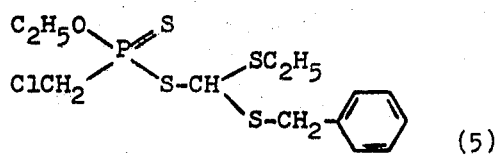

(5)

0.18-molar mixture:

45 g potassium chloromethyl-0-ethylthionothiolphosphonate were dissolved in 200 ml acetonitrile. To this solution were added, with stirring, 42 g benzylmercapto-monochloromethyl ethyl thioether; the mixture was heated to 65°C for a further hour and it was then worked up as in Example 5. There were so obtained 61 g (88 percent of theory) of chloromethyl-0-ethyl-S-[S'-ethylmercapto-S''-benzylmercapto-methyl]-thionothiolphosphonic acid ester with the refractive index $n_D^{21} = 1.6002$.

Calculated for a molecular weight of 386.5:

| P | 9.8 %; | found | 8.1 %; |
| S | 27.4 %; | | 27.2 %. |

It will be appreciated that the instant specification and examples are set forth by way of illustration and not limitation, and that various modifications and changes may be made without departing from the spirit and scope of the present invention.

What is claimed is:

1. A thiol- or thionothiol-phosphoric or -phosphonic acid ester of the formula

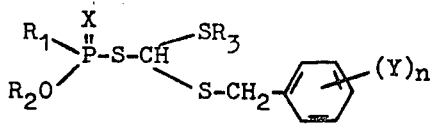

in which
R₁ is alkyl, halo substituted alkyl, alkoxy or halo substituted alkoxy of 1 to 6 carbon atoms,
R₂ is alkyl or halo substituted alkyl of 1 to 6 carbon atoms,
R₃ is alkyl of 1 to 6 carbon atoms,
X is oxygen or sulfur,
Y is chlorine, and
n is 0, 1 or 2.

2. A compound according to claim 1 in which R₃ is methyl or ethyl, and n is 0.

3. The compound according to claim 1 wherein such compound is 0,0-diethyl-S-[S'-ethylmercapto-S''-benzylmercaptomethyl]-thionothiolphosphoric acid ester of the formula

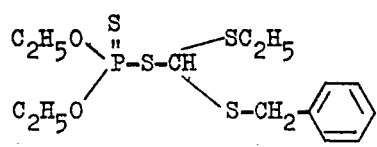

4. The compound according to claim 1 wherein such compound is ethyl-0-ethyl-S-[S'-ethylmercapto-S''-benzylmercapto-methyl]-thionothiolphosphonic acid ester of the formula

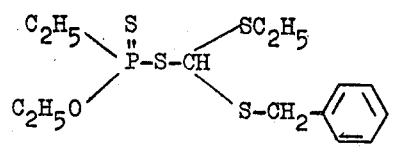

5. The compound according to claim 1 wherein such compound is 0,0-diethyl-S-[S'-ethylmercapto-S''-benzylmercapto-methyl]-thiolphosphoric acid ester of the formula

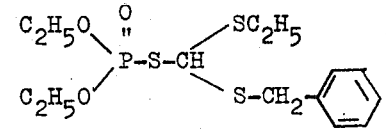

6. The compound according to claim 1 wherein such compound is ethyl-0-ethyl-S-[S'-ethylmercapto-S''-benzylmercaptomethyl]-thiolphosphonic acid ester of the formula

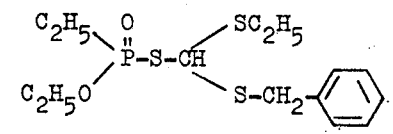

7. The compound according to claim 1 wherein such compound is chloromethyl-0-ethyl-S-[S'-ethylmercapto-S''-benzylmercapto-methyl]-thionothiolphosphonic acid ester of the formula

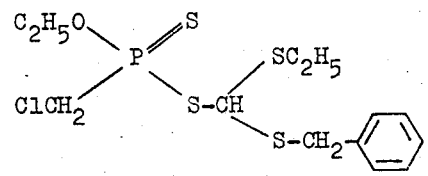

* * * * *